March 9, 1965 W. G. SCHNEIDER 3,173,116
ELECTRICAL APPARATUS HAVING MAGNETIC AND
NON-MAGNETIC SHIELDING Filed Dec. 31, 1962 4 Sheets-Sheet 1

Fig. I.

WITNESSES:
Bernard R. Gieguey
David J. Gould

INVENTOR
Wilbur G. Schneider
BY
J. E. Browder
ATTORNEY

United States Patent Office 3,173,116
Patented Mar. 9, 1965

3,173,116
ELECTRICAL APPARATUS HAVING MAGNETIC AND NON-MAGNETIC SHIELDING
Wilbur G. Schneider, Sharon, Pa., assignor to Westinghouse Electric Corporation, Pittsburgh, Pa., a corporation of Pennsylvania
Filed Dec. 31, 1962, Ser. No. 248,632
8 Claims. (Cl. 336—84)

This invention relates in general to electrical inductive apparatus such as fluid immersed air core coils used as current-limiting reactors or energy storage devices and more particularly to means for shielding the metal casing or tank surrounding such coils from the magnetic flux produced by a varying current flowing in the coils. In addition, this same means of shielding can be used to confine the magnetic flux within a certain volume for either air cooled or fluid immersed coils contained in a nonmetallic casing structure.

In the usual steel casing for containing air core coils in which a varying current is flowing, the hysteresis, eddy current, circulating current and other losses in the top, bottom and walls may become very large due to the entrapment of magnetic flux or the passage of magnetic flux through the casing. Objectionable energy losses in the form of excessive heating may then occur.

The above-mentioned difficulties may be partially overcome by placing electrically conductive shields between coils and the tank. The induced currents formed in these so-called bucking shields by the entrapped flux and by the circulating currents formed by the flux which passes through these shields creates a counter-flux which opposes the flux produced by the coils thereby reducing the total amount of magnetic flux passing through the tank surfaces.

Another method of minimizing the excessive heating effect and energy losses due to the entrapped flux or due to the flux which passes through the tank surfaces is to divert the flux from the tank surfaces through a low reluctance path of thin laminated ferromagnetic material mounted between the surfaces of the tank and the coils. The thin ferromagnetic laminations do not present a heating problem when correctly designed because the eddy currents therein are proportional to the square of the thickness of the laminations normal to the flux field.

The disadvantages of the former method are that for adequate shielding heavy conductive shields with relatively high eddy current losses must be used (the thickness of the shield increasing with the total flux produced by the coil if the same distance from the coil to the shield is maintained). Since this type of shield is essentially a shorted turn and because some of the flux will pass through the shield, there will be circulating currents in the shield and the result is less inductance for the given weight of conductor in the inductive apparatus.

The latter method has the disadvantage of requiring a considerable weight of ferromagnetic material to effectively shield the tank from the flux produced by the coils.

Accordingly, it is the general object of this invention to provide a new and improved shielding method for electrical inductive apparatus.

It is a more particular object of this invention to provide a new and improved low loss, low weight shielding system for electrical inductive apparatus by using a combination of ferromagnetic and electrically conductive shielding.

Briefly, the present invention accomplishes the above cited objects by using a unique arrangement of the two types of shielding to produce a new mode of operation. Magnetic shields are mounted near the inner surfaces of the tank enclosing the inductive apparatus. Between the magnetic shields are placed electrically conductive eddy-current shields so shaped as to direct the leakage magnetic flux into the magnetic shields. Electrically conductive shields are provided at each end of the device and are so shaped as to direct the leakage flux near the ends of the tank into the ferromagnetic shields located about the periphery of the tank.

If the reactor is intended for shunt application (where a relatively constant voltage is maintained across the reactor terminals) the electrically conductive side shields may be reduced in area by adding more magnetic side shields between the tank wall and the sides of the coil. One of the end shields may be omitted if less shielding is required.

If the reactor is used in a series application (where the voltage across the reactor terminals will vary in relation to the current through the reactor coils) at normal current most of the main coil flux is in the ferromagnetic shields while under short circuit conditions in which the ferromagnetic shields are close to saturation, the electrically conductive shields will act as induced current shields for the remainder of the leakage flux and effectively shield the tank. The end shields may be omitted if less shielding is required. The result is an essentially straight line characteristic for voltage drop versus current.

Further objects and advantages of the invention will become apparent as the following description proceeds and features of novelty which characterize the invention will be pointed out in particularity in the claims annexed to and forming a part of this application.

For a better understanding of the invention, reference may be had to the accompanying drawings in which.

Figure 1:
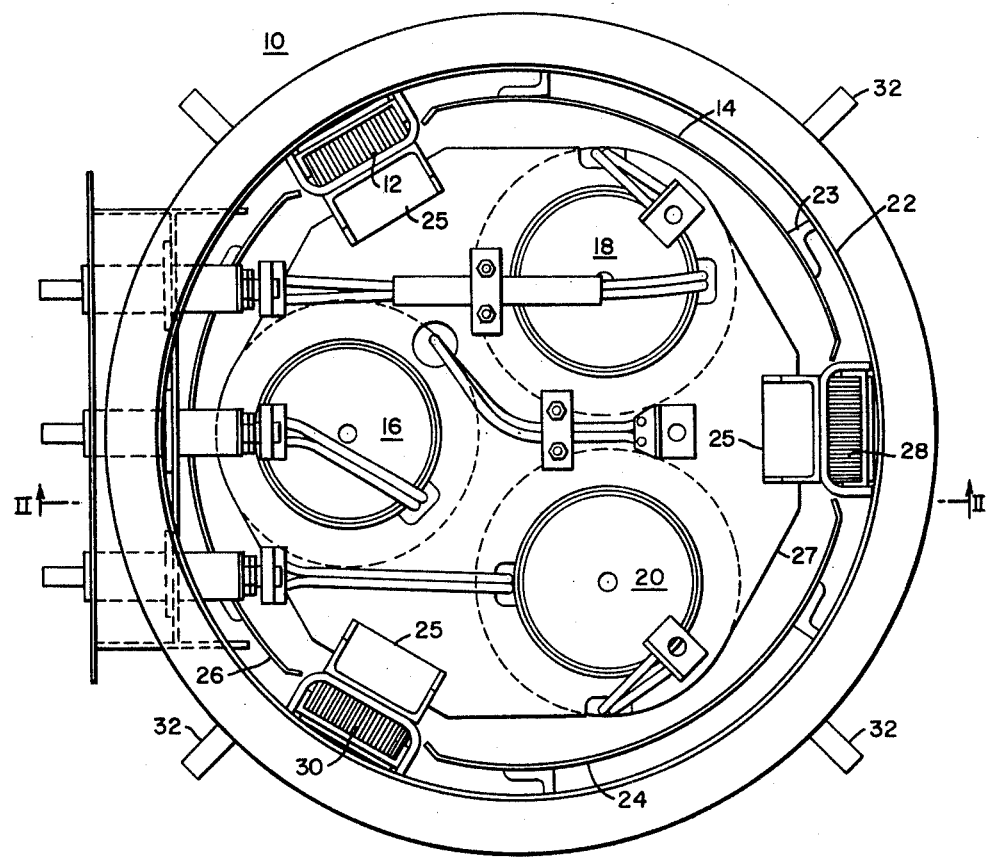
FIGURE 1 is a top plan view of a three-phase reactor in the circular tank.

Referring to the drawings and in particular to FIG. 1, the invention is illustrated by reference to a current limiting reactor shown generally at 10. In this instance, shielding of the metal tank wall 22 is provided by eddy current shields 14, 24 and 26 composed of electrically conductive material and arranged about the periphery of the metal tank wall 22 on supports such as 23 so as to force the stray magnetic flux escaping from energized electrical coils 16, 18 and 20 of reactor 10 into laminated magnetically conducting shields 12, 28 and 30 which are arranged about the circumference of the metallic tank wall 22 between alternate eddy-current shields 14, 24 and 26. The stray magnetic flux with its consequent heating and mechanical forces is thus minimized in the metallic tank wall 22 and in nearby ferromagnetic materials such as tank support members 32. Brackets such as 25 may be used to mount a plate 27 for the purpose of giving mechanical support to coils 16, 18 and 20.

Figure 2:
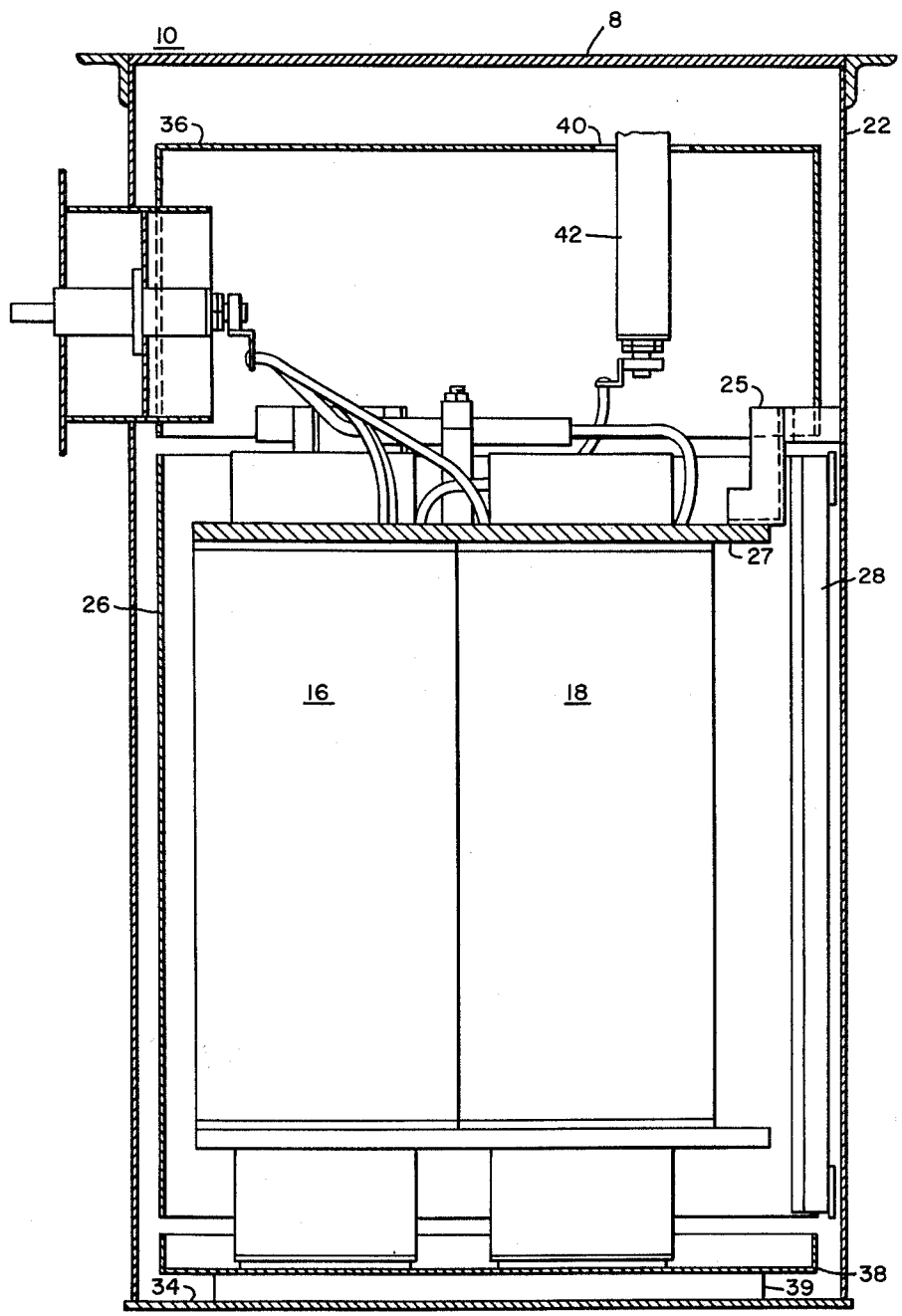
FIG. 2 is an elevation view of the reactor of FIG. 1, taken along the plane II—II.

Referring now to FIG. 2, it will be seen that the tank ends 8 and 34 of the reactor 10 have been shielded from the stray magnetic flux produced by the energized reactor coils such as 16 and 18 by eddy-current, electrically conductive end bucking shields 36 and 38 which are used to direct the leakage flux into the magnetically conducting shield bundles such as 28 distributed about the periphery of the reactor 10. The coaxial end plates or induced current end shields 36 and 38 are located as far from the reactor coils such as 16 and 18 as possible so as to be in the weakest part of the end leakage flux. This is done to minimize heating losses caused by the induced currents in the end bucking shields 36 and 38 necessary to produce the counter flux for the shielding action.

It is to be noted that the top end bucking shield 36 may be provided with an aperture 40 for bushing means such as 42. End bucking shield 36 may be held in place by brackets (not shown) attached to tank top 8 or tank wall 22.

Bottom end bucking shield 38 may be attached to a base 39 by any suitable method such as welding. Base 39 also serves as a spacer between the end bucking shield 38 and the tank bottom 34.

Figure 3:
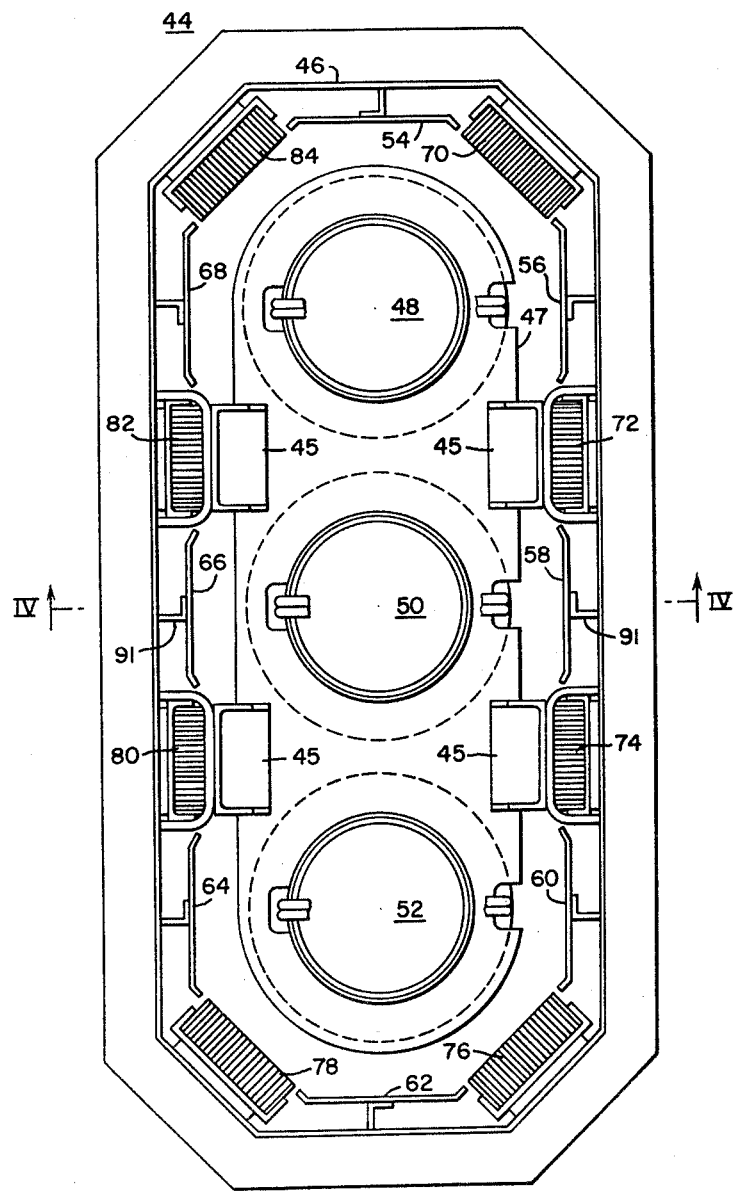
FIG. 3 is a top plan view of a three-phase reactor in an oblong tank.

FIG. 3 illustrates an alternative embodiment of the invention 44 in an oblong tank configuration 46 that is well suited to shipment because of its arrangement of coils 48, 50 and 52 in a substantially straight line. As in the previous configuration of the invention, the periphery of the tank 46 is lined with eddy-current shelds 54, 56, 58, 60, 62, 64, 66 and 68. The eddy-current shelds may be mounted to the wall 46 by brackets 91. The function of the eddy-current shelds is to direct the stray flux from the coils 48, 50 and 52 into magnetically conducting shield bundles 70, 72, 74, 76, 78, 80, 82 and 84 which are arranged about the metallic tank wall 46 between alternate eddy-current shelds 54, 56, 58, 60, 62, 64, 66 and 68. The stray magnetic flux is thus minimized in the metallic tank wall 46 because of the lower reluctance path provided by the laminated magnetic shielding bundles 70, 72, 74, 76, 78, 80, 82 and 84. Brackets such as 45 may be used to mount a plate member 47 for the purpose of giving mechanical support to coils 48, 50 and 52.

Figure 4:
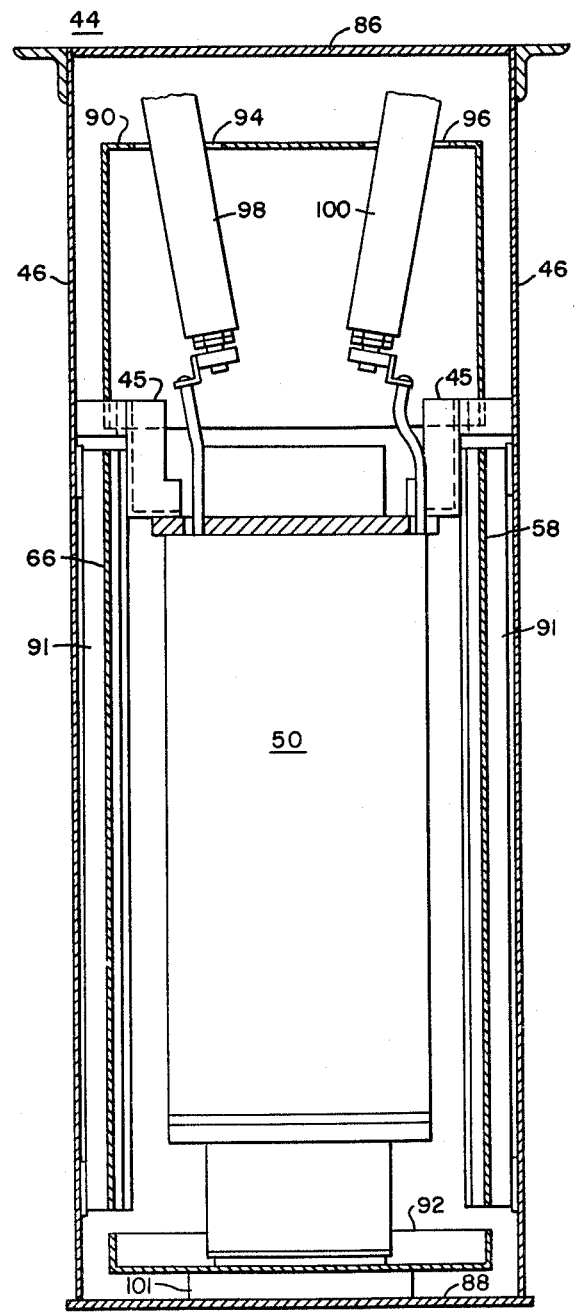
FIG. 4 is a view in elevation of the reactor of FIG. 3 taken along the plane IV—IV.

Referring now to FIG. 4, it will be seen that, as in the previous configuration of the invention, the tank ends 86 and 88 of the reactor 44 have been shielded from the stray magnetic flux of the coils such as coil 50 by eddy-current electrically conductive, end bucking shields 90 and 92 which may be used to direct the leakage flux from the ends of the coils such as coil 50 back toward the sides 46 of the reactor tank where the flux will follow the low reluctance path presented by the magnetically conducting shield bundles distributed about the periphery of the reactor 44. As in the previous embodiment of the invention, the end shields 90 and 92 are located as far from the coils, such as coil 50, as possible so as to be in the weakest part of the end leakage flux. This minimizes losses caused by the induced currents in the end bucking shields 90 and 92 that produce the counter flux necessary for the end shielding action.

Top end shield 90 may be held in place with brackets (not shown) attached to tank top 86 or tank wall 46. It is to be noted that the top end shield 90 may be provided with means for connecting the coils such as coil 50 to an external circuit by means of openings such as 94 and 96 to permit installation of bushing means such as 98 and 100.

Bottom induced current shield 92 may be fastened to a base 101 by any siutable means such as welding. Base 101 also functions as a spacer between the induced current shield 92 and the tank end 88.

It will, therefore, be apparent that there has been disclosed a new stray flux shielding device for electrical inductive apparatus that results in lower stray losses in a smaller volume tank than has been possible to achieve before. The linearity of the voltage drop versus current characteristic is also improved by the invention.

While there have been shown and described what are at present considered to be the preferred embodiments of the invention, modifications thereto will readily occur to those skilled in the art. For example, the magnetically conducting shield bundles might be continued about the ends of the reactor to form a closed path. It is not desired, therefore, that the invention be limited to the specific arrangements shown and described and I intend to include all such modifications as fall within the true spirit and scope of the invention.

I claim as my invention:

1. A magnetic flux shielding system for electric inductive apparatus comprising a plurality of bundles of ferromagnetic material disposed in spaced relation about said inductive apparatus, a first plurality of electrically conductive eddy current shields disposed intermediate said bundles of ferromagnetic material, said first plurality of electrically conductive eddy current shields directing stray magnetic flux from said electrical inductive apparatus into said bundles of ferromagnetic material.

2. A leakage magnetic flux shielding system for electric inductive apparatus comprising a plurality of groups of ferromagnetic laminations disposed in spaced parallel relation about said inductive apparatus, a plurality of electrically conductive eddy current shields positioned between said groups of ferromagnetic laminations, and two coaxial opposed electrically conductive eddy current shields positioned one at each end of the two ends formed by said groups of ferromagnetic laminations, said eddy current shields directing leakage magnetic flux from said electrical inductive apparatus into said plurality of groups of ferromagnetic laminations.

3. A magnetic flux shielding system for electric inductive apparatus comprising a plurality of groups of ferromagnetic laminations disposed in spaced relation about the periphery of said inductive apparatus, a plurality of electrically conductive eddy current shields positioned intermediate said groups of ferromagnetic laminations to direct stray magnetic flux into said groups of ferromagnetic laminations, and concave electrically conductive eddy current shields located at the ends of said electric inductive apparatus, the concavity of each of said concave shields facing toward the electric inductive apparatus to direct stray magnetic flux from the ends of said inductive apparatus into said groups of ferromagnetic laminations.

4. An electrical reactor comprising, a winding, a casing of metallic material, said winding being disposed within said casing, magnetic flux shielding means disposed between said winding and the sides of the casing including magnetically conducting shields comprising a plurality of strips of high permeability magnetic material attached together to form compact bundles, and electrically conductive eddy current shields which produce a counter flux by induced currents, said counter flux directing the stray flux from said winding into said magnetically conducting shields, and end shields comprising electrically conductive eddy current shields which produce a counter flux by induced currents, said counter flux of said end shields directing the stray flux from the ends of the reactor winding into said magnetically conducting shields.

5. An electrical reactor comprising a casing of metallic material, an electrical winding having its axes positioned vertically within said casing, magnetic flux shielding means disposed between said electrical winding and the sides of the casing, said magnetic flux shielding means comprising a plurality of bundles of strips of a ferromagnetic material with electrically conductive eddy current shields arranged between said bundles of ferromagnetic material to produce a counter magnetic flux by induced currents and direct stray magnetic flux from the sides of said electrical winding into said bundles of ferromagnetic material, and end shields comprising electrically conductive members producing a countermagnetic flux by induced currents to direct stray magnetic flux from the ends of the electrical winding into said bundles of ferromagnetic material, one of said end shields being provided with at least one opening for connecting the reactor winding to an external circuit.

6. An electrical reactor comprising, a cylindrical casing of metallic material, an electrical winding therein comprising three electrical coils disposed essentially at the apexes of an equilateral triangle, said coils having their axes positioned vertically within said casing, leakage magnetic flux shielding means disposed between said electrical windings and the sides of said casing comprising a plurality of strips of a high permeability ferromagnetic material in the form of spaced discrete bundles, electrically conductive eddy current shields disposed intermediate said spaced bundles directing stray magnetic flux from the sides of said electrical coils into said bundles of magnetic material, and end shields comprising electrically conductive eddy current shields disposed above and below said electrical coils directing stray flux from the ends of said electrical coils into said bundles of ferromagnetic material.

7. An electrical reactor comprising, an oblong casing of metallic material, an electrical winding disposed within said casing comprising three electrical coils disposed substantially in an in-line configuration and having their axes positioned vertically within said casing, shielding means disposed between said electrical windings and the sides of said casing comprising a plurality of strips of magnetic material attached together in the form of long thin bundles, with electrically conductive eddy current shields disposed between said bundles of magnetic material to direct stray magnetic flux from the sides of said electrical coils into said bundles of magnetic material, and end shields comprising electrically conductive eddy current shields directing stray magnetic flux from said ends of the electrical coils into said bundles of magnetic material.

8. A leakage magnetic flux shielding system for magnetic flux producing apparatus comprising, a plurality of bundles of magnetic material each comprising a plurality of laminations of magnetic material, said bundles being positioned vertically in spaced relation about the periphery of the apparatus to be shielded, and electrically conductive induced current counter magnetic flux shields disposed intermediate said bundles and above the top and below the bottom of the apparatus to be shielded, said electrically conductive induced current counter magnetic flux shields cooperating with said bundles of magnetic material by forcing leakage magnetic flux escaping from said inductive apparatus into said bundles of magnetic material.

References Cited in the file of this patent

UNITED STATES PATENTS

| | | |
|---|---|---|
| 1,335,837 | Jacobson | Apr. 6, 1920 |
| 2,340,081 | Sauer | Jan. 25, 1944 |